US010896345B2

(12) United States Patent
Mandal et al.

(10) Patent No.: US 10,896,345 B2
(45) Date of Patent: Jan. 19, 2021

(54) FEATURE VECTOR GENERATION AND ENCRYPTION

(71) Applicant: FUJITSU LIMITED, Kawasaki (JP)

(72) Inventors: Avradip Mandal, Sunnyvale, CA (US); Arnab Roy, Santa Clara, CA (US); Hart Montgomery, Redwood City, CA (US); Nilanjan Datta, Kolkata (IN)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 15/613,118

(22) Filed: Jun. 2, 2017

(65) Prior Publication Data
US 2018/0349729 A1 Dec. 6, 2018

(51) Int. Cl.
G06K 9/48 (2006.01)
G06K 9/62 (2006.01)
G06K 9/46 (2006.01)
G06F 21/60 (2013.01)

(52) U.S. Cl.
CPC ........... G06K 9/481 (2013.01); G06K 9/4642 (2013.01); G06K 9/6202 (2013.01); G06K 9/6215 (2013.01); G06K 9/6232 (2013.01); G06F 21/602 (2013.01); G06K 9/4671 (2013.01)

(58) Field of Classification Search
CPC .... G06K 9/481; G06K 9/6202; G06K 9/6215; G06F 21/602
See application file for complete search history.

(56) References Cited

U.S. PATENT DOCUMENTS

| 9,503,266 | B2 | 11/2016 | Mandal et al. | |
| 9,641,981 | B2* | 5/2017 | Steinbach | G06F 16/5854 |
| 10,503,775 | B1* | 12/2019 | Ranzinger | G06K 9/6202 |
| 2015/0243048 | A1* | 8/2015 | Kim | G06K 9/4652 |
| | | | | 382/165 |

(Continued)

FOREIGN PATENT DOCUMENTS

EP 1574988 A1 * 9/2005 ........... G06K 9/4647

OTHER PUBLICATIONS

Zou et al., Efficient and secure encrypted image search in mobile cloud computing, Soft Computing, Springer Verlag, Berlin, vol. 21, No. 11, Apr. 19, 2016, pp. 2959-2969.

(Continued)

*Primary Examiner* — Pinalben Patel
(74) *Attorney, Agent, or Firm* — Maschoff Brennan (57) ABSTRACT

A method may include extracting feature-data from an image which includes location data that indicates multiple locations within the image and multiple feature vectors that each correspond to one of the multiple locations. Each feature vector may represent a feature of an object in the image. The method may include determining a feature-data plot based on relative positions of the multiple locations and selecting a grid for the feature-data plot. The method may include generating a first representative feature vector for a first cell of the grid based on a first feature vector set and generating a second representative feature vector for a second cell of the grid based on a second feature vector set. The method may include generating a single feature vector that represents the object in the image based on the first representative feature vector and the second representative feature vector and encrypting the single feature vector.

16 Claims, 7 Drawing Sheets

(56) References Cited

U.S. PATENT DOCUMENTS

| | | | |
|---|---|---|---|
| 2016/0027051 A1* | 1/2016 | Gross | G06Q 50/16 705/14.54 |
| 2016/0171340 A1 | 6/2016 | Fleishman et al. | |
| 2017/0109512 A1* | 4/2017 | Bower | G06F 21/602 |
| 2017/0126972 A1* | 5/2017 | Evans, V | G06T 3/4038 |
| 2020/0082540 A1* | 3/2020 | Roy Chowdhury | G05D 1/0088 |
| 2020/0184259 A1* | 6/2020 | Viswanathan | G06K 9/627 |

OTHER PUBLICATIONS

Extended European Search Report for corresponding application No. EP 18167897.0, dated Oct. 30, 2018.

Avradip Mandal and Arnab Roy. "Relational Hash: Probabilistic Hash for Verifying Relations, Secure Against Forgery and More." CRYPTO 2015. (Aug. 1, 2015).

Yevgeniy Dodis, Leonid Reyzin, and Adam Smith. "Fuzzy extractors: How to generate strong keys from biometrics and other noisy data." International Conference on the Theory and Applications of Cryptographic Techniques. (Jan. 20, 2008).

David G Lowe. Object recognition from local scale-invariant features. In Computer vision, 1999. The proceedings of the seventh IEEE international conference on, vol. 2, pp. 1150-1157. IEEE (Sep. 1999).

Yan Ke and Rahul Sukthankar. PCA-SIFT: A more distinctive representation for local image descriptors. In Computer Vision and Pattern Recognition, 2004. CVPR 2004. Proceedings of the 2004 IEEE Computer Society Conference on, vol. 2, pp. II, 506. IEEE, (Jun. 27, 2004).

Herbert Bay, Tinne Tuytelaars, and Luc Van Gool. SURF: Speeded up robust features. In European conference on computer vision, pp. 404-417. (2006).

David G Lowe. Distinctive image features from scale-invariant keypoints. International journal of computer vision, 60(2):91-110 (Jan. 2004)).

* cited by examiner

FEATURE VECTOR GENERATION AND ENCRYPTION

FIELD

The embodiments discussed in the present disclosure are related to feature vector generation and encryption.

BACKGROUND

Features of objects depicted in images may be extracted from images. For example, in some instances, multiple feature vectors may be extracted with respect to an object depicted in an image.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include extracting feature-data from an image. The feature-data may include location data that indicates multiple locations within the image and multiple feature vectors that each correspond to one of the multiple locations of the location data. Each feature vector may represent a feature of an object depicted in the image at its corresponding location. The method may include determining a feature-data plot of the feature vectors. The feature-data plot may be based on relative positions of the multiple locations with respect to each other. The method may include selecting a grid that overlays the feature-data plot.

The method may include generating a first representative feature vector for a first cell of the grid. The first representative feature vector may be based on a first feature vector set of one or more first feature vectors of the feature-data plot that are included in the first cell. The method may include generating a second representative feature vector for a second cell of the grid. The second representative feature vector may be based on a second feature vector set of one or more second feature vectors of the feature-data plot that are included in the second cell. The method may include generating a single feature vector that represents the object in the image. The single feature vector may be based on the first representative feature vector and the second representative feature vector. The method may include encrypting the single feature vector.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In some instances images may be encrypted to protect sensitive material that may be included in the images. Additionally, in some instances encrypted images may be compared to determine whether they depict similar or the same objects such that the sensitive nature of the images may not be compromised during the comparison.

For example, medical images may be encrypted to protect the privacy of patients. As another example, photographers may encrypt their images to protect their copyrights. In some instances, photographers may compare the encrypted images for duplicate images to be deleted to reduce memory usage. Comparison of the encrypted images may permit images that are saved in different formats to be compared without changing formats of the images, whereas comparison of unencrypted images may not permit comparison of images in different formats. As yet another example, a sensitive image and images included in a database may be separately encrypted. The encrypted sensitive image may be compared to the encrypted images included in the database to determine if a copy of the sensitive image is included in the database. If there is a copy of the sensitive image in the database, the copy of the sensitive image in the database may be detected and deleted without exposing the sensitive image to a risk of being copied. Alternatively, if the database does not include a copy of the sensitive image, the encryption may protect the sensitive image from being compromised during the comparison. The above listed examples are not to be viewed as limiting of the invention but are intended to represent possible example uses with respect to the present disclosure.

In some instances, the encryption of an image may be performed with respect to a feature vector representing an object that may be depicted in the image. Common feature extraction algorithms typically output multiple feature vectors for an image. However, the multiple feature vectors that are typically output may not be very amenable to secure encryption. For example, individually encrypting each of the multiple feature vectors may cause individually encrypted feature vectors to be susceptible to attacks that exploit small entropy of individual feature vectors. For example, the individually encrypted feature vectors may be susceptible to brute force attacks that attack individually encrypted feature vectors one at a time. Additionally, in order to determine if copies of the image are included in a database, each of the multiple encrypted feature vectors may be compared to other encrypted feature vectors representing features of images included in the database, which may further expose the multiple encrypted feature vectors to attacks designed to decrypt the multiple encrypted feature vectors.

According to one or more embodiments described in the present disclosure, a single feature vector of an image may be generated based on the multiple feature vectors that may be extracted from the image. The single feature vector may then be encrypted. The encrypted single feature vector that is generated based on the multiple feature vectors may have a much larger amount of entropy than that of an individually encrypted one of the multiple feature vectors such that the encrypted single feature vector may be more secure. Additionally, as discussed further below, the encrypted single feature vector may be compared against one or more other similarly encrypted single feature vectors of other images to determine whether the corresponding objects are the same or substantially similar.

Embodiments of the present disclosure are explained with reference to the accompanying drawings.

Figure 1A:
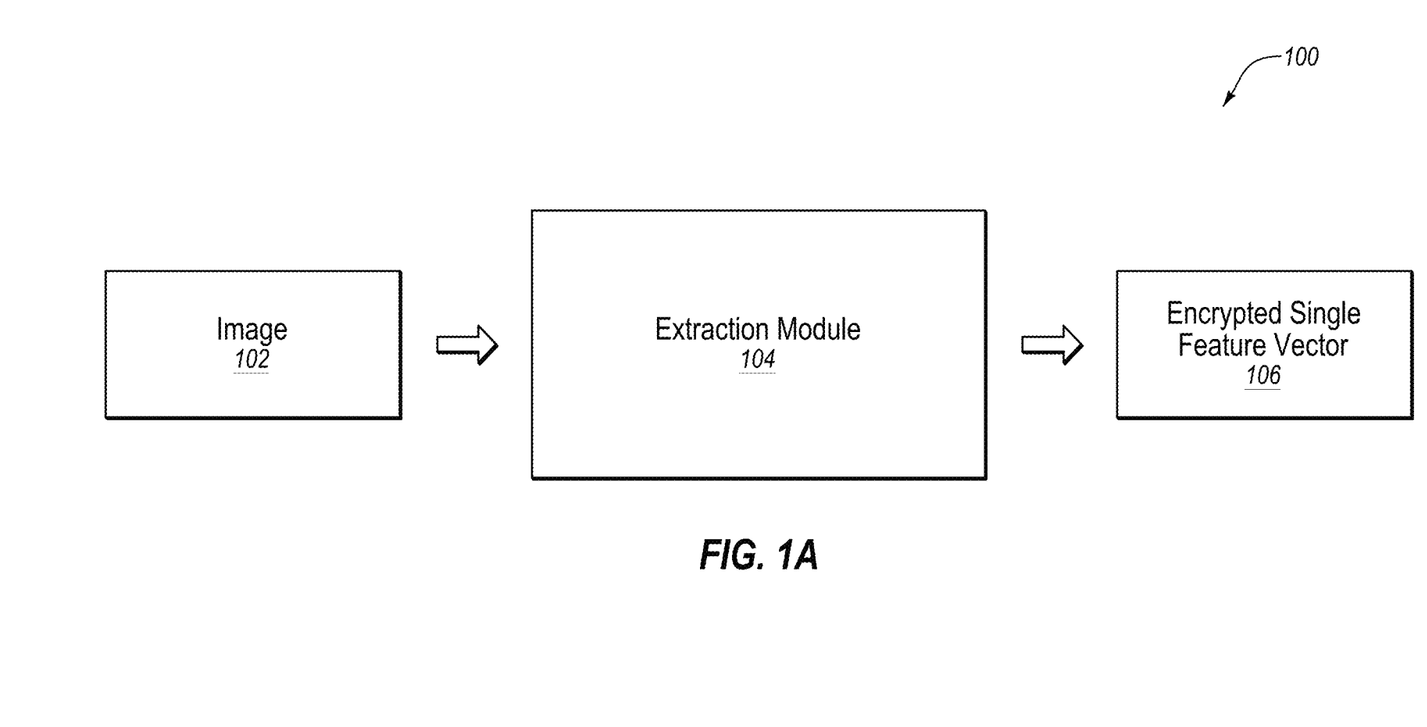
FIG. 1A illustrates an example environment related to generating a single feature vector with respect to an image.

FIG. 1A illustrates an example environment 100 related to generating a single feature vector with respect to an image 102, arranged in accordance with at least one embodiment described in the present disclosure. The environment 100 may include an extraction module 104 configured to generate a single feature vector from the image 102. The extraction module 104 may also be configured to output an encrypted single feature vector 106, which may represent an object included in the image 102.

The extraction module 104 may include code and routines configured to enable a computing device to perform feature extraction from and encryption of the image 102. Additionally or alternatively, the extraction module 104 may be implemented using hardware including a processor, a microprocessor (e.g., to perform or control performance of one or more operations), a field-programmable gate array (FPGA), or an application-specific integrated circuit (ASIC). In some other instances, the extraction module 104 may be implemented using a combination of hardware and software. In the present disclosure, operations described as being performed by the extraction module 104 may include those which the extraction module 104 may direct a corresponding system to perform.

The extraction module 104 may be configured to perform a series of extraction operations with respect to the image 102 that may be used to extract feature data from the image 102. For example, the extraction module 104 may be configured to detect one or more features of the object included in the image 102. In some embodiments, the detected features may include one or more of edges, corners, blobs, and/or ridges of the object included in the image 102. In some embodiments, the feature data may correspond to the detected features of the object included in the image 102 and may indicate locations and/or characteristics of the detected features.

For example, in some embodiments, the feature data may include location data. In some embodiments, the location data may indicate locations of multiple detected features of the object included in the image 102. For example, the location data may include particular location data that may indicate where at least a portion of the particular detected feature may be located in the image 102. For instance, in some embodiments, the particular location data may indicate one or more pixels of the image that may correspond to where the particular detected feature may be located or where the particular detected feature may begin. In another example, the particular location data may indicate a distance and a height of the detected feature from a point within the image 102. In yet another example, the location data may include X and Y coordinates of a grid that overlays the image 102.

The feature data may also include multiple feature vectors that each may represent one or more characteristics of a corresponding detected feature. For example, a particular feature vector may indicate a width, a direction, a size, a length, etc. of the particular detected feature. In some embodiments, the feature vectors may be associated with the location data that corresponds to the same detected features as the feature vectors in the feature data. For example, the particular feature vector that represents the particular feature may be associated with particular location data that indicates the location of the particular feature that may be represented by the particular feature vector. As an example, the feature data may be organized as follows in some embodiments: $\{(x_i, y_i), v_i=(v_{0,i}, v_{1,i}, v_{2,i}, \ldots, v_{127,i})\}_{i=0}^n$. The variables $x_i$ and $y_i$ may represent the location of the corresponding detected feature as X and Y coordinates. Additionally, the variable $v_i$ may represent the feature vector that includes the one or more characteristics of the corresponding detected feature. Different elements of the feature vector $v_i$ may represent different characteristics of the corresponding detected feature. For example, element $v_{0,i}$ of the feature vector $v_i$ may represent the direction of the corresponding detected feature and element $v_{1,i}$ of the feature vector $v_i$ may represent the width of the corresponding detected feature. In some embodiments, each element of the feature vector $v_i$ may represent a different characteristic of the corresponding detected feature. Additionally or alternatively, each element of the feature vector $v_i$ may represent a portion of a characteristic of the corresponding detected feature. In some embodiments, the feature vector may include more than 128 elements. Additionally or alternatively, the feature vector $v_i$ may include less than 128 elements. Additionally or alternatively, the feature vector $v_i$ may include 128 elements.

In an example, the object included in the image 102 may include four corners and the extraction module 104 may be configured to extract feature data that includes the locations of the four corners of the object. Additionally, the extraction module 104 may generate four feature vectors that correspond to each of the different corners of the object. In these or other embodiments, the feature vectors may indicate a direction of a line that extends from the corner, a length of the line from the corner, a width of the line at the corner, change of color of the line from the corner, change of contour of the line from the corner, or any visible change or local anomaly in the line that is useful for image recognition. In another example, the extraction module 104 may be configured to detect corners and ridges of the object included in the image 102. The extraction module 104 may detect the corners and ridges of the object and may generate a feature vector for each detected corner and each detected ridge of the object. Each of the feature vectors may correspond to a different corner or ridge of the object. The feature vectors may be generated according to any suitable technique. For example, in some embodiments, the feature vectors may be generated using a scale-invariant feature transform (SIFT), a speeded up robust features (SURF), an oriented FAST and rotated brief (ORB) algorithm, a variant of the SIFT, SURF, or ORB algorithms, or any other image recognition algorithm which outputs a set of feature vectors.

Figure 1B:
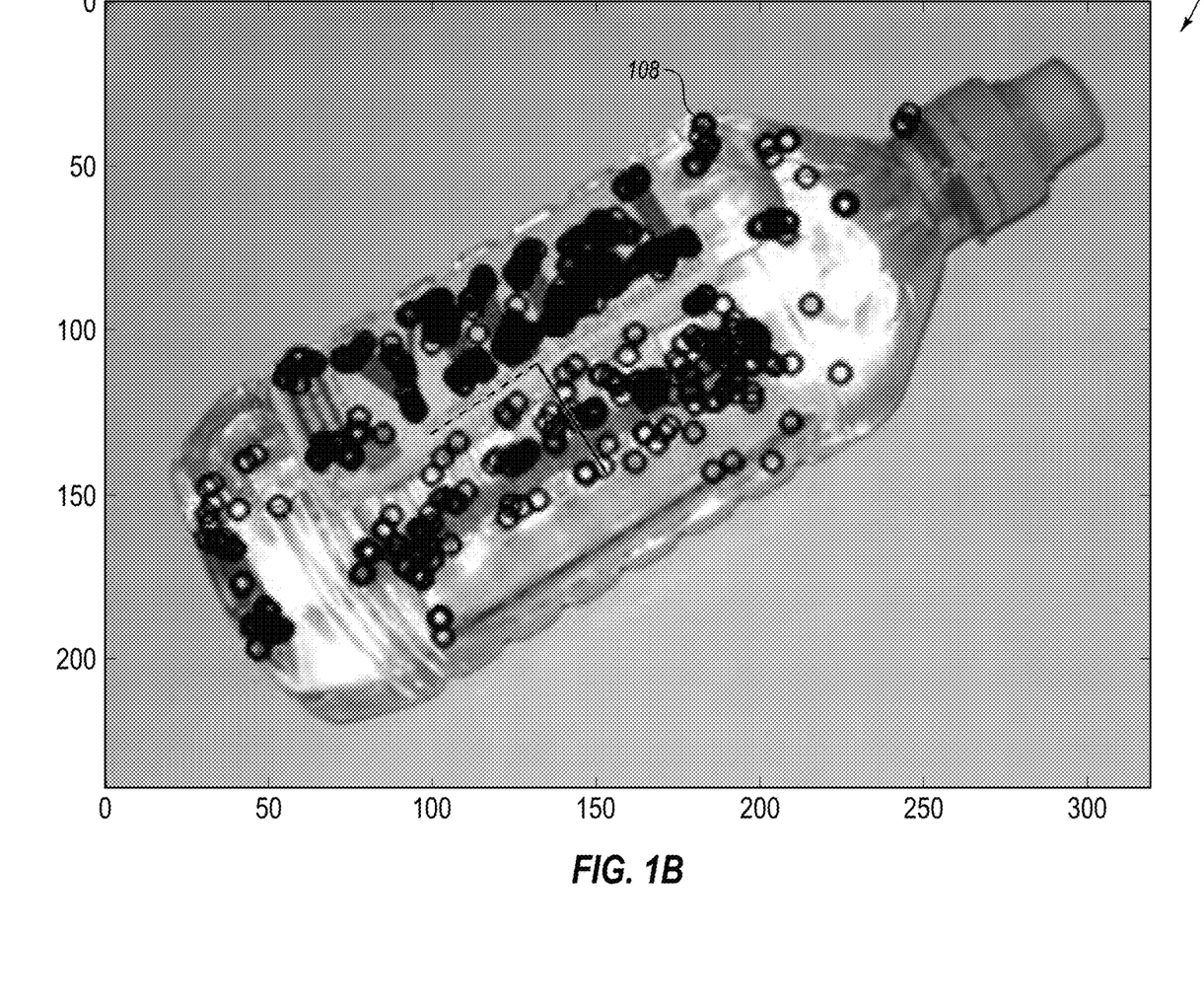
FIG. 1B illustrates an example image of a water bottle with features marked as dots within the example image.

By way of example, FIG. 1B illustrates an example image 110 of a water bottle with features marked as dots within the example image 110. In the illustrated example, a feature vector may be generated for each of the features. The feature vectors may be generated as discussed above. In some embodiments, the feature vectors may be included in feature data that may correspond to the water bottle.

Additionally, in these or other embodiments, a location may be identified for each of the features and corresponding location data may be generated. By way of example, the example image 110 includes a grid that overlays the example image 110. In the example image 110, the X axis has a range between 0 and 250 and the Y axis has a range between 0 and 350. In some embodiments, the axis values may represent a number of pixels in a direction of each of the axis. The location data may represent a location of a detected feature within the grid of the example image 110. For example, location data that corresponds to a feature 108 may roughly have an X coordinate of 40 and a Y coordinate of 180.

In some embodiments, the location data may be included in the feature data that corresponds to the water bottle. Additionally or alternatively, the location data may be associated with the feature vectors in the feature data to indicate the locations in the example image 110 of the features that are represented by the feature vectors. In some embodiments, the feature data may be organized as indicated above.

Referring back to FIG. 1A, the extraction module 104 may be configured to determine a feature-data plot of the feature vectors. The feature-data plot may be configured to represent a locational relationship between the multiple detected features of the object included in the image 102. For example, in some embodiments, the feature-data plot may represent a locational relationship between the multiple detected features and a first axis and a second axis of the feature-data plot. In some instances, the first axis and the second axis may be based on locational relationships of the features represented by the feature vectors. In the present disclosure, the feature-data plot may be referred to as including features or feature-vectors. Such reference may in actuality be referring to the relative positions of the corresponding features or feature-vectors as represented by the feature-data plot in some instances.

For example, the locations of the multiple detected features of the object may form a shape of an ellipse and the first axis and the second axis may correspond to a major axis (e.g., a relatively longer axis of the ellipse) and a minor axis (e.g., a relatively shorter axis of the ellipse) of the locations of the multiple detected features of the object. Additionally or alternatively, in some instances, the locations of the multiple detected features may form a shape in which the first axis and the second axis may be equal lengths. For example, the locations of the detected features may form a shape of a circle or a square.

In some embodiments, an orientation of the object included in the image may be determined based on relative locations of the multiple detected features of the object included in the image 102. The orientation of the object may be used to determine the first axis and the second axis of the feature-data plot. The orientation of the object included in the image may be determined according to any suitable technique. For example, in some embodiments, the orientation may be determined using a principal component analysis (PCA) algorithm.

In some instances, the first axis and/or the second axis may be determined so as to maximize variance and/or minimize error between the locations of the multiple detected features and the first and/or the second axis. In some embodiments, the locations of the first and second axis that maximize variance may be locations in which each of the locations of the multiple detected features may be projected both at an angle perpendicular to the first axis and the second axis and projected to a location on the first axis and the second axis that is different than a projected location for each of the other locations of the multiple detected features. Likewise, the locations of the first and second axis that minimize error may be locations in which a distance between each of the locations of the multiple detected features and the first axis and the second axis is minimized.

In some embodiments, the first axis and the second axis may be determined based on the X and Y coordinates that correspond to where the multiple detected features are located. For example, the X and Y coordinates that correspond to where the multiple detected features are located may be used to determine the locations of the first axis and the second axis that maximize variance and/or minimize error between the multiple detected features and the first and second axis. Likewise, the X and Y coordinates may be used to determine a projected location of the locations of the multiple detected features on the possible locations for the first and second axis. Additionally or alternatively, the X and Y coordinates may be used to determine the distance between the locations of the multiple detected features and the possible locations for the first and second axis.

In some embodiments, the first axis and the second axis may be determined based on the pixels that correspond to where the multiple detected features are located or the multiple detected features begin. The pixels that correspond to where the multiple detected features are located or the multiple detected features begin may be used similarly to the X and Y coordinates as discussed above to determine the locations of the first axis and/or the second axis that maximize variance and/or minimize error between the locations of the multiple detected features and the first and second axis. In some instances, the first axis and the second axis may be determined based on the distance and the height of the locations of the multiple detected features from the point within the image 102. The distance and height of the locations of the multiple detected features may be used similarly to the X and Y coordinates and the pixels as discussed above to determine the locations of the first axis and/or the second axis that maximize variance and/or minimize error between the locations of the multiple detected features and the first and second axis.

In some embodiments, determining the first axis and the second axis may change a basis of the locations of the multiple detected features of the object included in the image 102. The changed basis may transform a coordinate representation of the locations of multiple detected features to be based on the first and second axis of the feature-data plot. For example, the changed basis may transform the coordinate representation of the locations of the multiple detected features from X and Y coordinates to first and second axis coordinates. In another example, the changed basis may transform the coordinate representation of the locations of the multiple detected features from the pixels that correspond to where the multiple detected features are located or the multiple detected features begin to the first and second axis coordinates. In yet another example, the changed basis may transform the coordinate representation of the locations of the multiple detected features from distance and height of the locations of the multiple detected features from the point within the image 102 to the first and second axis coordinates.

In some embodiments, the locations of the multiple detected features may be centered and/or normalized to compensate for non-uniform scaling, rotation, translation, or any combination thereof of different images. Centering and/or normalizing the locations of the multiple detected features may improve consistency of comparing objects included in different images since the locations of the multiple detected features corresponding to the objects included in the different images may be more uniformly scaled and/or positioned than compared to the different images. The centered and/or normalized locations of the multiple detected features may be represented in the feature-data plot by a location of a corresponding feature vector for each of the centered and/or normalized locations of the multiple detected features.

In some embodiments, the extraction module 104 may be configured to select a grid that overlays the feature-data plot. The grid may divide the feature-data plot into multiple cells that each correspond to a different portion of the feature-data plot. The grid may divide the feature-data plot along the first axis and the second axis.

In some instances, the grid may be selected based on a probability distribution such that the locations of the feature vectors within the feature-data plot follow the selected probability distribution. As will be discussed below, sections of the first and second axis of the grid may be based on a distribution curve corresponding to the distribution of the locations of the feature vectors. In some embodiments, the distribution of the locations of the feature vectors may be determined by the extraction module 104.

In some embodiments, the extraction module 104 may select the probability distribution based on the detected distribution of the locations of the multiple detected features. Additionally or alternatively, the probability distribution may be selected based on a distribution of the locations of the detected features in different images. For example, the distribution of the locations of the detected features of the object included in the image 102 may be known from previously performing feature detection of a different image that includes the same object. In other embodiments, the probability distribution may be based on a predetermined distribution of feature types of a particular object.

In some embodiments, the distribution curve corresponding to the selected probability distribution may be placed along the first axis and/or the second axis. A bottom point of the distribution curve being overlaid so as to determine the sections of the first axis may be located at the low or high bound of the second axis. A top point of the distribution curve being overlaid so as to determine the sections of the first axis may be located at the opposite bound as the bottom point of the distribution curve. Likewise, the bottom point of the distribution curve being overlaid so as to determine the sections of the second axis may be located at the low or high bound of the first axis. A top point of the distribution curve being overlaid so as to determine the sections of the second axis may be located at the opposite bound as the bottom point of the distribution curve. Overlaying distribution curves to cover all values of the first and second axis may increase the likelihood that all of the locations of the feature vectors are within the overlaid distribution curves.

For example, the low bound of an X axis may be −3 and the high bound of the X axis may be 4, the bottom point of the distribution curve being overlaid so as to determine the sections of the Y axis may be located at x=−3 and the top point of the distribution curve being overlaid so as to determine the sections of the Y axis may be located at x=4. Additionally or alternatively, the bottom point of the distribution curve being overlaid so as to determine the sections of the Y axis may be located at x=4 and the top point of the distribution curve being overlaid so as to determine the sections of the Y axis may be located at x=−3.

In another example, the low bound of a Y axis may be −5 and the high bound of the Y axis may be 5, the bottom point of the distribution curve being overlaid so as to determine the sections of the X axis may be located at y=−5 and the top point of the distribution curve being overlaid so as to determine the sections of the X axis may be located at y=5. Additionally or alternatively, the bottom point of the distribution curve being overlaid so as to determine the sections of the X axis may be location at y=5 and the top point of the distribution curve being overlaid so as to determine the sections of the X axis may be located at y=−5.

An area beneath the distribution curve may represent the probability that a corresponding coordinate of the particular axis corresponds to the location of one or more feature vectors. The area beneath the distribution curve may be used to determine a size of the different sections of the first axis and/or the second axis. The first axis and/or the second axis may be divided so that each section of the first axis and/or the second axis includes an equal portion of the area beneath the distribution curve.

The multiple cells in the grid may be formed by overlapping the different sections of the first and second axis. In these and other embodiments, the multiple cells may be distributed such that a probability that each of the multiple cells includes the locations of one or more feature vectors is the same or approximately the same for each cell. A larger number of cells in the grid may reduce a number of locations of feature vectors that are within each cell of the grid. Reducing the number of locations of feature vectors within each cell may reduce the number of cells that have a significantly large number of locations of feature vectors. For example, a grid with fifty cells may have more locations of feature vectors within each cell than a grid with one hundred cells. Additionally or alternatively, including fewer cells in the grid may reduce the number of locations of feature vectors that are located in different cells in different images.

For example, the grid may be selected based on the locations of the feature vectors having a Gaussian distribution along the first axis and the second axis of the feature-data plot. A Gaussian distribution curve may be placed along the first axis and the second axis. The first axis and the second axis may be divided so that each section of the first axis and the second axis includes an equal portion of an area beneath the overlaid Gaussian distribution curve. The sections of the first axis and the second axis may be placed such that the sections of the first axis overlap the sections of the second axis and form the multiple cells in the grid. Each of the multiple cells may have an equal probability of including a location of one or more feature vectors for both the first axis and the second axis since the size of the cells were created based on the Gaussian distribution curve. Additionally or alternatively, the grid may be selected based on the locations of the feature vectors having a Beta distribution, a discrete uniform distribution, or any well suited distribution created based on empirical data along the first axis and the second axis of the feature-data plot.

Figure 1C:
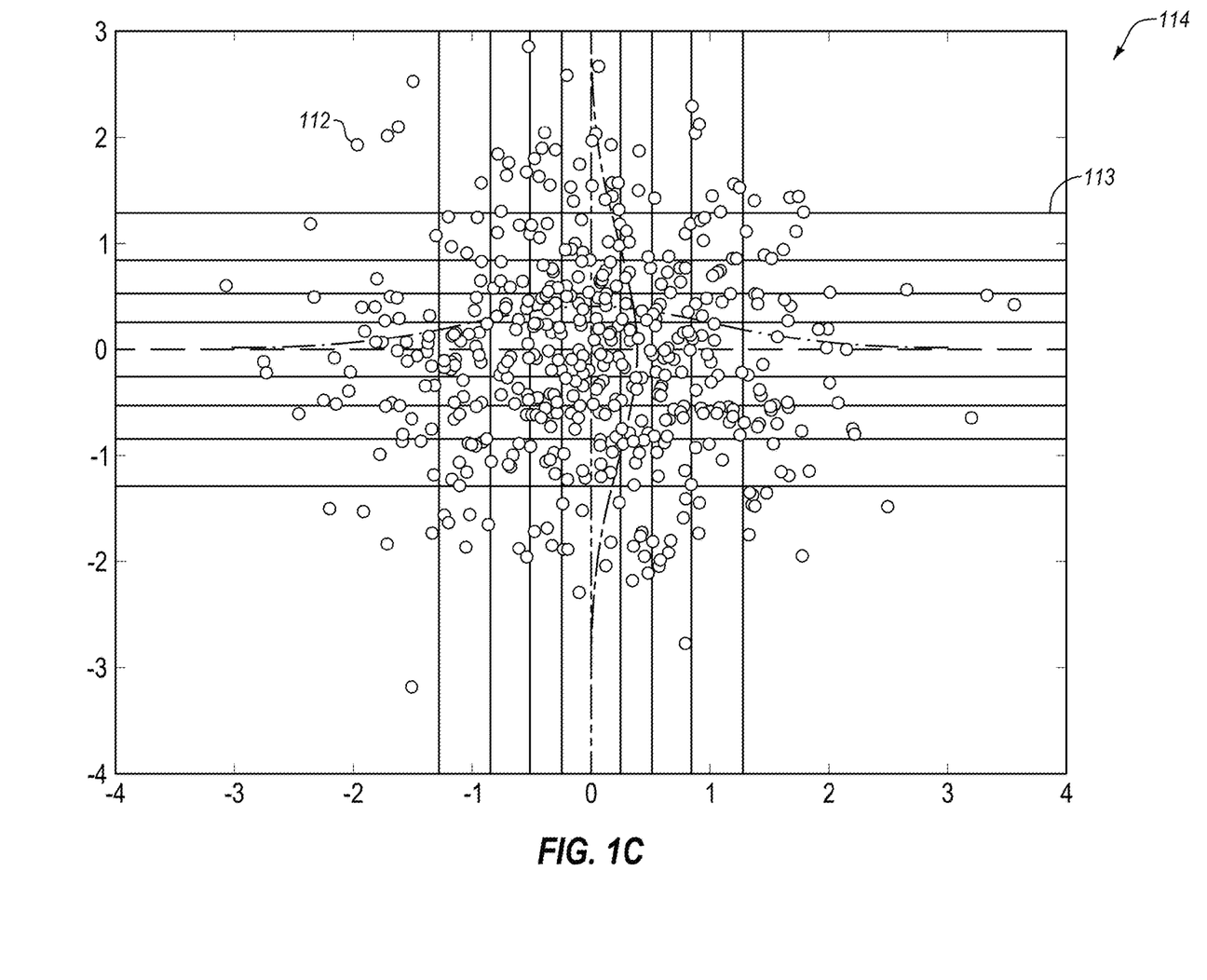
FIG. 1C illustrates an example feature-data plot with locations of multiple feature vectors marked as circles within the example feature-data plot and a grid; overlaying the example feature-data plot.

By way of example, FIG. 1C illustrates an example feature-data plot 114 with locations of multiple feature vectors marked as circles within the example feature-data plot 114 and a grid 113 overlaying the example feature-data plot 114. In the illustrated example, the example feature-data plot 114, the locations of the multiple feature vectors, and the grid 113 may be generated as discussed above. In the example feature-data plot 114, the X axis may correspond to the first axis or the second axis and the Y axis may correspond to the first axis or the second axis. In some embodiments, the X axis may correspond to the major axis and the Y axis may correspond to the minor axis of the locations of the multiple detected features. The example feature-data plot 114 may correspond to the example image 110 of the water bottle of FIG. 1B.

In these and other embodiments, a location may be identified for each of the multiple detected features as discussed above in relation to FIG. 1B. The locations of the multiple detected features of FIG. 1B may form an ellipse. The major axis and the minor axis of the locations of the multiple detected features may be determined based on relative locations of the multiple detected features with respect to each other. An orientation of the water bottle may be determined based on the relative locations of the multiple detected features (e.g., based on the major axis and the minor axis). The locations of the multiple detected features may be centered and/or normalized to create the example feature-data plot 114 uniformly. Each of the centered and/or normalized locations of the multiple detected features may be represented by a location of a corresponding feature vector in the example feature-data plot 114.

The example feature-data plot 114 includes the grid 113 that overlays the example feature-data plot 114. The grid 113 in the example feature-data plot 114 is based on the locations of the feature vectors having a Gaussian distribution along each axis of the example feature-data plot 114. A Gaussian distribution curve may be placed along each axis of the example feature-data plot 114. Each axis may be divided into ten sections which include equal portions of the area beneath the Gaussian distribution curve. The ten sections of the first axis and the ten sections of the second axis may be overlaid such that the different sections cross each other. The overlaid sections may create one hundred cells within the grid 113 in which each of the one hundred cells includes an even probability of including a location of one or more feature vectors along each axis.

By way of example, the X axis and the Y axis have a range between −4 and 4. In this embodiment, the axis values correspond to a probability density function according to the Gaussian distribution of the locations of the feature vectors. For example, a location of a feature vector 112 may roughly have an X coordinate of −2 and a Y coordinate of 2.

Referring back to FIG. 1A, the extraction module 104 may be configured to generate a representative feature vector for each cell of the grid. The multiple representative feature vectors may be based on a set of feature vectors associated with each corresponding cell in the grid. For example, a first representative feature vector may be based on a first set of feature vectors associated with a first cell of the grid. Likewise a second representative feature vector may be based on a second set of feature vectors associated with a second cell of the grid. In some embodiments, the first representative feature vector may be based on all of the feature vectors associated with the first cell of the grid. Additionally or alternatively, the second representative feature vector may be based on all of the feature vectors associated within the second cell of the grid.

In some embodiments, the extraction module 104 may be configured to generate the multiple representative feature vectors by combining the corresponding set of feature vectors associated with each cell through any acceptable mathematical operation. Example mathematical operations may be addition, subtraction, division, and/or multiplication. The above listed example mathematical operations are not to be viewed as limiting of the invention but are intended to represent possible example mathematical operations with respect to the present disclosure. For example, the extraction module 104 may be configured to generate the multiple representative feature vectors by averaging the corresponding set of feature vectors associated with each cell.

For example, a corresponding set of feature vectors may include three feature vectors. Each of the three feature vectors may indicate the length and width of corresponding detected features. All three length values included in the feature vectors may be added together and divided by three to determine the average length of the detected features represented in the corresponding set of feature vectors. Likewise, all three width values included in the feature vectors may be added together and divided by three to determine the average width of the detected features represented in the corresponding set of feature vectors. The representative feature vector may include the average length of the detected features and the average width of the detected features in the corresponding set of feature vectors.

In these or other embodiments, the extraction module 104 may be configured to generate the multiple representative feature vectors based on one or more of the characteristics indicated in the corresponding set of feature vectors being scaled in comparison to other characteristics indicated in the corresponding set of feature vectors. For example, the feature vectors in the corresponding set of feature vectors may include information indicating a direction, a length, and a width of the multiple detected features. The length characteristic may be weighted greater than the width and direction characteristics. The multiple representative feature vectors may be based relatively more on the length characteristic of the feature vectors of the corresponding feature vector set than the width and direction characteristics. In some embodiments, the one or more characteristics indicated in the corresponding set of feature vectors being scaled may be selected based on empirical evidence that the characteristic being scaled increases security and accuracy.

In some embodiments, the set of feature vectors may lie in a normed vector space. If the set of feature vectors lie in the normed vector space, the average of all the feature vectors in the set of feature vectors may be used to generate the multiple representative feature vectors. In some embodiments, the set of feature vectors may lie in normed vector space by using the SIFT or SURF algorithms to generate the feature vectors.

In some embodiments, the set of feature vectors may lie in a vector space in which a distance between each feature vector may be determined by the number of elements in the feature vectors that are different (e.g., Hamming vector space). In these and other embodiments, the extraction module 104 may be configured to generate the multiple representative feature vectors to have a distance (e.g., Hamming distance) which is equidistant from all of the feature vectors in each corresponding set of feature vectors.

For example, the first set of feature vectors may include a first feature vector, a second feature vector, and a third feature vector, each of which may include four elements. The four elements of the first feature vector may be represented by "0000," the four elements of the second feature vector may be represented by "1100," and the four elements of the third feature vector may be represented by "0011." The representative feature vector of the first set of feature vectors may be represented by "0110," which has a Hamming distance of two (e.g., two of the four elements are different) from each of the three corresponding feature vectors. In some embodiments, the set of feature vectors may lie in Hamming vector space by using the ORB algorithm to generate the feature vectors.

Figure 1D:
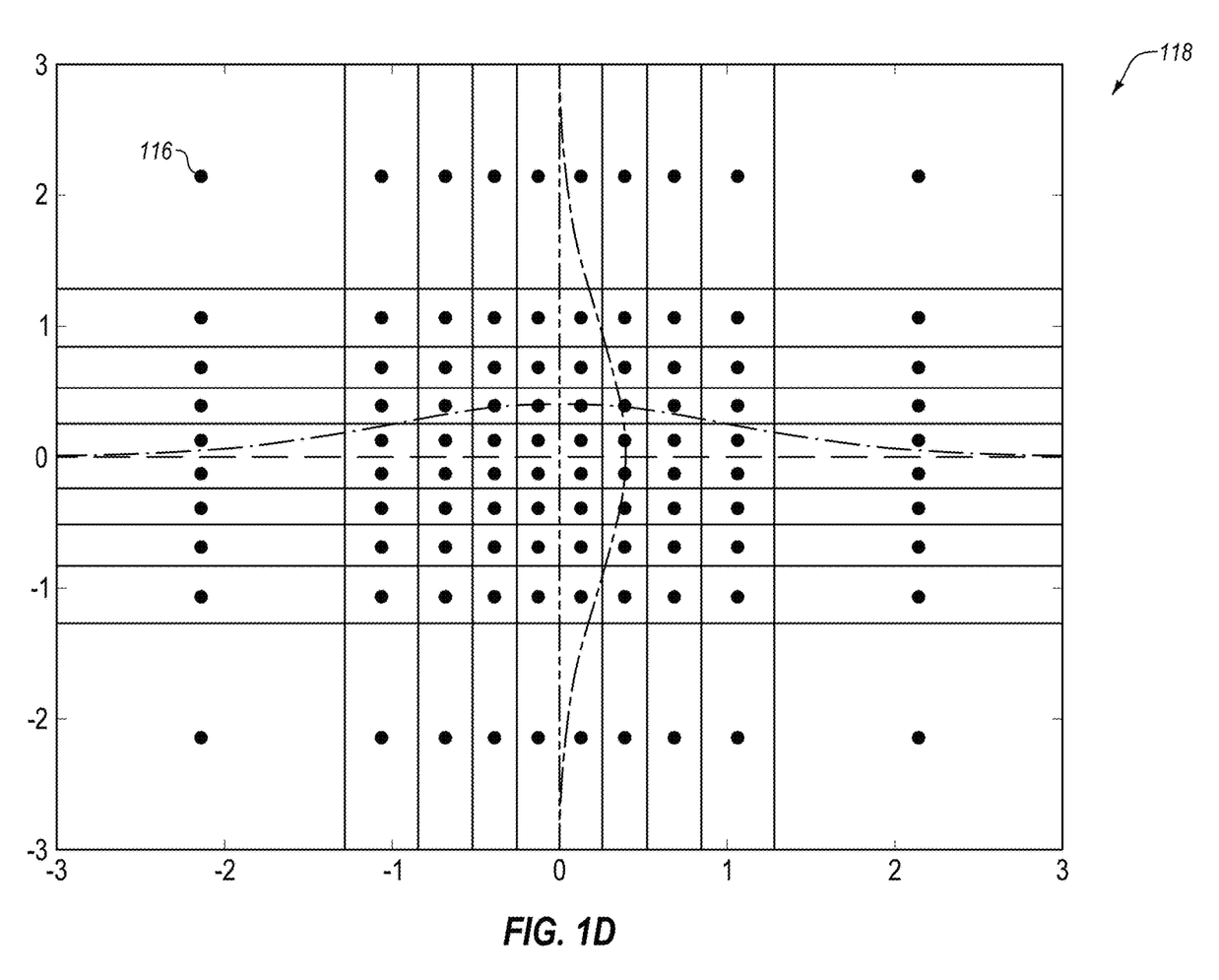
FIG. 1D illustrates an example distribution grid with one solid circle included in each cell of the example distribution grid.

By way of example, FIG. 1D illustrates an example distribution grid 118 with one solid circle included in each cell of the example distribution grid 118. Each of the solid circles is an indication of the representative feature vector that may be determined with respect to the feature vectors with locations that are included in the corresponding cell. It is noted that the locations of the solid dots in FIG. 1D do not necessarily indicate an average of the locations of the feature vectors that correspond to the representative feature vector included in the corresponding cell. Instead, a particular solid circle being included in a particular cell is merely meant to indicate that a particular representative feature vector that corresponds to the particular cell represents the feature vectors with locations that fell within the particular cell. The sections of each of the axis and the cells in the distribution grid 118 may be the same or similar to the sections and cells in the example feature-data plot 114 of FIG. 1B. In the illustrated example, the multiple representative feature vectors may be generated for each cell of the grid. The multiple representative feature vectors may be generated as discussed above.

Additionally, in these and other embodiments, the multiple representative feature vectors may be based on a set of feature vectors associated with the corresponding cells in the grid. The multiple representative feature vectors may be generated for each cell in the grid. In some embodiments, the multiple representative feature vectors may have been generated by averaging the corresponding set of feature vectors associated with the cell. The averaging of the set of feature vectors may have been performed using weighted or non-weighted averaging. Additionally or alternatively, the multiple representative feature vectors may have been generated to have a Hamming distance which is equidistant from each of the feature vectors in the corresponding set of feature vectors. For example, a location of a first representative feature vector 116 may be located in a first cell of the example distribution grid 118.

Referring back to FIG. 1A, the extraction module 104 may be configured to generate a single feature vector that represents the object included in the image 102. The single feature vector may be based on the multiple representative feature vectors. The characteristics indicated in each of the multiple representative feature vectors may be included in the single feature vector. Including the characteristics indicated in each of the multiple representative feature vectors may permit the entire object included in the image 102 to be represented in the single feature vector. Omitting characteristics indicated in the multiple representative feature vectors may create differences in different single feature vectors representing the object in different images.

In some embodiments, the single feature vector may be generated by concatenating each of the multiple representative feature vectors based on an ordering sequence of cells in the grid For example, the ordering sequence may start in a bottom right cell and may move right to left within the rows, each row being concatenated in this order starting at a bottom row and moving to a top row. In another example, the ordering sequence may be based on an ordering sequence of cells within different quadrants of the grid. The above listed examples are not to be viewed as limiting of the ordering sequence but are intended to represent possible examples of the ordering sequence with respect to the present disclosure.

Additionally or alternatively, the ordering sequence may be based on an encryption level for encrypting the single feature vector. In some embodiments, if a higher encryption level is to be used, the ordering sequence may be a random sequence. In some instances, the random sequence may be determined by the extraction module 104. Randomly ordering the concatenation of the multiple representative feature vectors may increase an amount of entropy between generated single feature vectors, which may increase a difficulty of decrypting the single feature vector.

In some embodiments, the extraction module 104 may be configured to encrypt the single feature vector and output the encrypted single feature vector 106. The single feature vector may be encrypted according to any suitable technique. For example, in some embodiments, the single feature vector may be encrypted using a Relational Hash or Fuzzy Extractor algorithm. The encrypted single feature vector 106 may protect sensitive information included in the image 102 from being accessed by unauthorized users or databases.

In some embodiments, the encrypted single feature vector 106 may be a first encrypted single feature vector. In these and other embodiments, the extraction module 104 may be configured to compare the first encrypted single feature vector to a second single feature vector that has been encrypted ("the second encrypted single feature vector"). In some instances, the second encrypted single feature vector may be generated and encrypted separately of the first encrypted single feature vector but using the same technique. Based on the comparison, the extraction module 104 may be configured to determine whether the object represented in the first encrypted single feature vector is the same as an object represented in the second encrypted single feature vector. In some instances, the two objects represented by the first encrypted single feature vector and the second encrypted single feature vector may be exactly the same or may have small variations with respect to each other. In these and other embodiments, a determination may be made that the two objects are the same in either situation as long as the first encrypted single feature vector and the second encrypted single feature vector are the same within a particular margin of error. The particular margin of error may vary depending on a particular level of security or accuracy that may be set for the particular application. Comparing encrypted single feature vectors may allow different images in different formats to be compared without changing the format of the different images.

Additionally or alternatively, the extraction module 104 may be configured to compare the first encrypted single feature vector to the second single feature vector in which the second single feature vector has not been encrypted ("the second unencrypted single feature vector"). Based on the comparison, the extraction module 104 may be configured to determine whether the object represented in the first encrypted single feature vector is the same as the object represented in the second unencrypted single feature vector. In some embodiments, the extraction module 104 may compare the first encrypted single feature vector to the second unencrypted single feature vector using a Secure Sketch algorithm or a relational hash algorithm. Comparing an encrypted single feature vector to an unencrypted single feature vector may allow different images to be compared without consuming processing power or taking time to encrypt the unencrypted images and also protects the sensitive information included in an associated image from being accessed by unauthorized user or databases. Additionally or alternatively, the first single feature vector may not be encrypted and the second single feature vector may be encrypted during the comparison or neither the first single feature vector nor the second single feature vector may be encrypted during the comparison.

Modifications, additions, or omissions may be made to FIG. 1A without departing from the scope of the present disclosure. For example, the environment 100 may include more or fewer elements than those illustrated and described in the present disclosure. In addition, in some embodiments, one or more routines, one or more instructions, or at least a portion of code of the extraction module 104 may be combined or separated. In some embodiments operations may be performed in a different order from what is described above.

Figure 2:
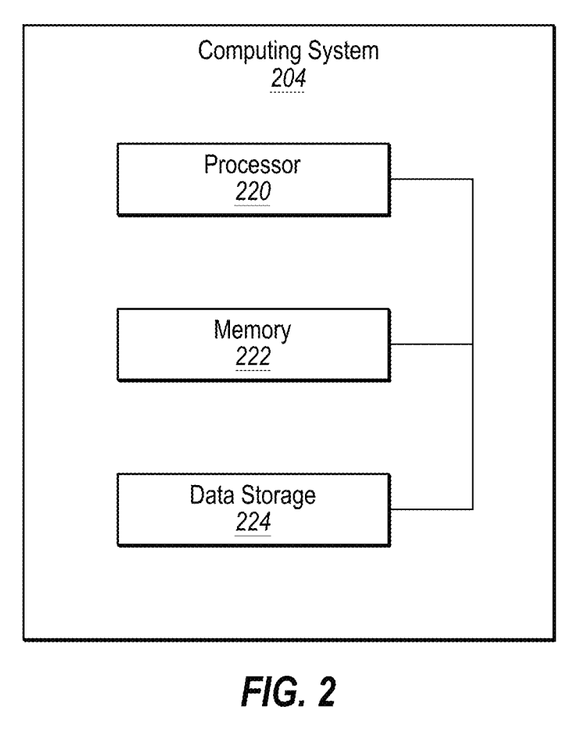
FIG. 2 illustrates a block diagram of an example computing system that may be configured to generate a single encrypted feature vector.

FIG. 2 illustrates a block diagram of an example computing system 204 that may be configured to generate a single encrypted feature vector, according to at least one embodiment of the present disclosure. The computing system 204 may be configured to implement or direct one or more operations associated with an extraction module (e.g., the extraction module 104 of FIG. 1). The computing system 204 may include a processor 220, a memory 222, and a data storage 224. The processor 220, the memory 222, and the data storage 224 may be communicatively coupled.

In general, the processor 220 may include any suitable special-purpose or general-purpose computer, computing entity, or processing device including various computer hardware or software modules and may be configured to execute instructions stored on any applicable computer-readable storage media. For example, the processor 220 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 220 may include any number of processors configured to, individually or collectively, perform or direct performance of any number of operations described in the present disclosure. Additionally, one or more of the processors may be present on one or more different electronic devices, such as different servers.

In some embodiments, the processor 220 may be configured to interpret and/or execute program instructions and/or process data stored in the memory 222, the data storage 224, or the memory 222 and the data storage 224. In some embodiments, the processor 220 may fetch program instructions from the data storage 224 and load the program instructions in the memory 222. After the program instructions are loaded into memory 222, the processor 220 may execute the program instructions.

For example, in some embodiments, the extraction module may be included in the data storage 224 as program instructions. The processor 220 may fetch the program instructions of the extraction module from the data storage 224 and may load the program instructions of the extraction module in the memory 222. After the program instructions of the extraction module are loaded into memory 222, the processor 220 may execute the program instructions such that the computing system may implement the operations associated with the extraction module as directed by the instructions.

The memory 222 and the data storage 224 may include computer-readable storage media for carrying or having computer-executable instructions or data structures stored thereon. Such computer-readable storage media may include any available media that may be accessed by a general-purpose or special-purpose computer, such as the processor 220. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 220 to perform a certain operation or group of operations.

Modifications, additions, or omissions may be made to the computing system 204 without departing from the scope of the present disclosure. For example, in some embodiments, the computing system 204 may include any number of other components that may not be explicitly illustrated or described.

Figure 3:
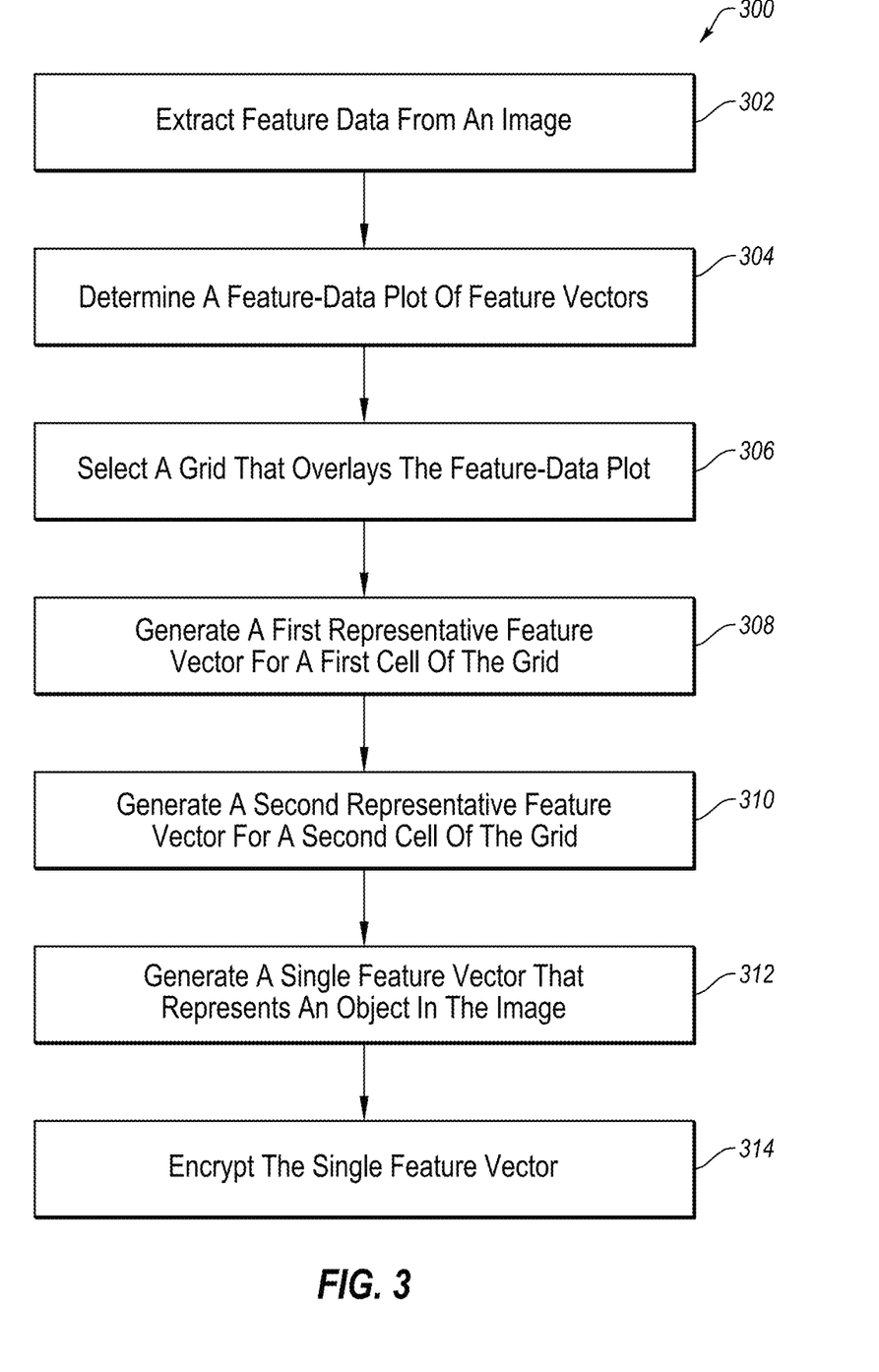
FIG. 3 depicts a flowchart of an example method of generating an image vector.

FIG. 3 depicts a flowchart of an example method of generating an image vector, according to at least one embodiment described in the present disclosure. The method 300 may be performed by any suitable system, apparatus, or device with respect to an image (e.g., the image 102 of FIG. 1A). For example, the extraction module 104 of FIG. 1A or the computing system 204 of FIG. 2 (e.g., as directed by an extraction module) may perform or direct performance of one or more of the operations associated with the method 300 with respect to the image. Although illustrated with discrete blocks, the steps and operations associated with one or more of the blocks of the method 300 may be divided into additional blocks, combined into fewer blocks, or eliminated, depending on the particular implementation.

The method 300 may include a block 302, at which feature data may be extracted from an image. The feature data may include location data and multiple feature vectors. The location data may indicate multiple locations of detected features within the image. The multiple feature vectors may each correspond to one of the multiple detected features. Each feature vector may represent a different detected feature of an object depicted in the image at the feature's corresponding location.

At block 304, a feature-data plot of the feature vectors may be determined. The feature-data plot may be based on relative locations of the multiple detected features with respect to each other.

At block 306, a grid that overlays the feature-data plot may be selected. In some embodiments, the grid may be selected based on a distribution of locations of the multiple feature vectors in the feature-data plot. In some instances, the grid may be selected based on the first cell of the grid and the second cell of the grid having an even probability of including one or more feature vectors.

At block 308, a first representative feature vector for the first cell of the grid may be generated. The first representative feature vector may be based on a first feature vector set of one or more first feature vectors of the feature-data plot that are included in the first cell. In some embodiments, the first representative feature vector may be generated by averaging the one or more first feature vectors of the first feature vector set. In these and other embodiments, the averaging of the one or more first feature vectors of the first feature vector set may be performed using a weighted average of the first feature vector set.

At block 310, a second representative feature vector for the second cell of the grid may be generated. The second representative feature vector may be based on a second feature vector set of one or more second feature vectors of the feature-data plot that are included in the second cell. In some embodiments, the second representative feature vector may be generated by averaging the one or more second feature vectors of the second feature vector set. In these and other embodiments, the averaging of the one or more second feature vectors of the second feature vector set may be performed using a weighted average of the second feature vector set.

At block 312, a single feature vector that represents the object in the image may be generated. The single feature vector may be based on the first representative feature vector and the second representative feature vector. In some embodiments, the single feature vector may be generated by concatenating the first representative feature vector and the second representative feature vector. In these and other embodiments, the first representative feature vector and the second representative feature vector may be concatenated by ordering the first representative feature vector and the second representative feature vector based on an ordering sequence of cells within the grid. Additionally or alternatively, the ordering of the first representative feature vector and the second representative feature vector may be based on an encryption level for encrypting the single feature vector. At block 314, the single feature vector may be encrypted.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 300 may be performed iteratively in which a single feature vector may be generated for multiple objects included in the image. Additionally or alternatively, one or more operations associated with one or more blocks may be performed with respect to multiple objects located in an image at a time.

Figure 4:
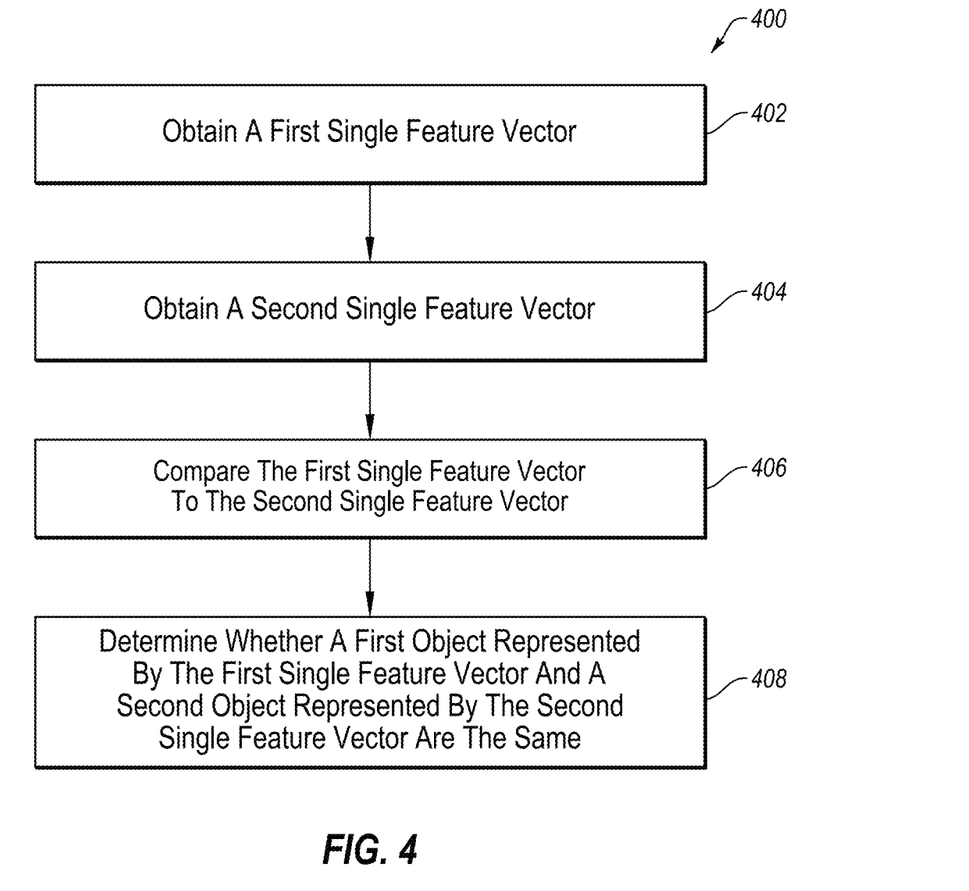
FIG. 4 depicts a flowchart of an example method of determining whether a first object in a first image and a second object in a second image are the same.

FIG. 4 depicts a flowchart of an example method of determining whether a first object in a first image and a second object in a second image are the same, according to at least one embodiment described in the present disclosure. The method 400 may be performed by any suitable system, apparatus, or device with respect to an image. For example, the extraction module 104 of FIG. 1A or the computing system 204 of FIG. 2 (e.g., as directed by an extraction module) may perform or direct performance of one or more of the operations associated with the method 400 with respect to the image. Although illustrated with discrete blocks, the steps and operations associated with one or more of the blocks of the method 400 may be divided into additional blocks, combined into fewer blocks, or eliminated, depending on the particular implementation.

The method 400 may begin at block 402, at which a first single feature vector may be obtained. In some embodiments, the first single feature vector may be an encrypted first single feature vector. Additionally or alternatively, the first single feature vector may be an unencrypted first single feature vector. The first single feature vector may be generated by a first extraction module such as the extraction module 104 of FIG. 1A. The first single feature vector may represent a first object in the first image.

At block 404, a second single feature vector may be obtained. In some embodiments, the second single feature vector may be an encrypted second single feature vector. Additionally or alternatively, the second single feature vector may be an unencrypted second single feature vector. The second single feature vector may be separately generated and/or encrypted from the first encrypted single feature vector. In some embodiments, the second single feature vector may be generated by the extraction module 104 of FIG. 1A. In these or other embodiments, the second single feature vector may be generated by a different extraction module. The second single feature vector may represent a second object in the second image.

At block 406, the first single feature vector and the second single feature vector may be compared. In some embodiments, the first single feature vector and the second single feature vector may both be encrypted during the comparison. Additionally or alternatively, the first single feature vector and the second single feature vector may both be unencrypted during the comparison. In these or other embodiments the first single feature vector may be encrypted during the comparison and the second single feature vector may be unencrypted during the comparison, or vice versa. At block 408, whether the first object represented by the first encrypted single feature vector and the second object represented by the second single feature vector are the same may be determined. In some embodiments, whether the first object represented by the first encrypted single feature vector and the second object represented by the second single feature vector are the same may be determined based on the comparison of the first encrypted single feature vector and the second single feature vector.

Modifications, additions, or omissions may be made to the method 400 without departing from the scope of the present disclosure. For example, the operations of method 400 may be implemented in a differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 400 may be performed iteratively in which the first single feature vector may be compared to multiple encrypted single feature vectors. In another example, in some embodiments, the method 400 may be performed using a Relational Hash algorithm or a Secure Sketch algorithm for comparing the first single feature vector to the second single feature vector.

As indicated above, the embodiments described in the present disclosure may include the use of a special purpose or general purpose computer (e.g., the processor 220 of FIG. 2) including various computer hardware or software modules, as discussed in greater detail below. Further, as indicated above, embodiments described in the present disclosure may be implemented using computer-readable media (e.g., the memory 216 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of generating an image vector, the method comprising:

extracting feature data from an image, the feature data including:

location data that indicates a plurality of locations within the image; and a plurality of feature vectors that each correspond to one of the plurality of locations of the location data in which each feature vector represents a feature of an object depicted in the image at its corresponding location;

determining a feature-data plot of each of the feature vectors extracted from the image based on relative positions of the plurality of locations with respect to each other;

selecting a grid that overlays the feature-data plot of the feature vectors extracted from the image based on a particular probability of distribution of the plurality of feature vectors with respect to cells of the grid;

generating a first representative feature vector for a first cell of the grid based on a first feature vector set of one or more first feature vectors of the feature-data plot that are included in the first cell;

generating a second representative feature vector for a second cell of the grid based on a second feature vector set of one or more second feature vectors of the feature-data plot that are included in the second cell;

generating a single feature vector that represents the object in the image based on the first representative feature vector and the second representative feature vector; and encrypting the single feature vector.

2. The method of claim 1, wherein the generating the first representative feature vector comprises averaging the one or more first feature vectors of the first feature vector set.

3. The method of claim 2, wherein the averaging the one or more first feature vectors of the first feature vector set comprises averaging the one or more first feature vectors of the first feature vector set based on a weighted average of the first feature vector set.

4. The method of claim 1, wherein the selecting the grid comprises selecting the grid based on the first cell of the grid and the second cell of the grid having an even probability of including one or more feature vectors.

5. The method of claim 1, wherein the generating the single feature vector comprises concatenating the first representative feature vector and the second representative feature vector.

6. The method of claim 5, wherein the concatenating the first representative feature vector and the second representative feature vector comprises ordering the first representative feature vector and the second representative feature vector based on an ordering sequence of cells within the grid.

7. The method of claim 6, wherein the ordering the first representative feature vector and the second representative feature vector based on the ordering sequence of cells within the grid comprises ordering the first representative feature vector and the second representative feature vector based on a particular permutation associated with a particular security level.

8. The method of claim 1, wherein:

the image is a first image;

the object is a first object;

the encrypted single feature vector is an encrypted first single feature vector; and the method further comprises:

comparing the encrypted first single feature vector to an encrypted second single feature vector, wherein the encrypted second single feature vector represents a second object of a second image; and determining whether the first object and the second object are the same based on the comparing the encrypted first single feature vector to the encrypted second single feature vector.

9. A system of generating an image vector, the system comprising:

one or more non-transitory computer-readable storage media having instructions stored thereon; and one or more processors communicatively coupled to the one or more computer-readable storage media and configured to cause the system to perform operations in response to executing the instructions stored on the one or more computer-readable storage media, the operations comprising:

extracting feature data from an image, the feature data including:

location data that indicates a plurality of locations within the image; and a plurality of feature vectors that each correspond to one of the plurality of locations of the location data in which each feature vector represents a feature of an object depicted in the image at its corresponding location;

determining a feature-data plot of each of the feature vectors extracted from the image based on relative positions of the plurality of locations with respect to each other;

selecting a grid that overlays the feature-data plot of the feature vectors extracted from the image based on a particular probability of distribution of the plurality of feature vectors with respect to cells of the grid;

generating a first representative feature vector for a first cell of the grid based on a first feature vector set of one or more first feature vectors of the feature-data plot that are included in the first cell;

generating a second representative feature vector for a second cell of the grid based on a second feature vector set of one or more second feature vectors of the feature-data plot that are included in the second cell;

generating a single feature vector that represents the object in the image based on the first representative feature vector and the second representative feature vector; and encrypting the single feature vector.

10. The system of claim 9, wherein the first representative feature vector comprises a first averaged feature vector of the one or more first feature vectors of the first feature vector set.

11. The system of claim 10, wherein the first averaged feature vector of the one or more first feature vectors of the first feature vector set is based on a weighted average of the one or more first feature vectors of the first feature vector set.

12. The system of claim 9, wherein the grid is selected based on the first cell of the grid and the second cell of the grid having an even probability of including one or more feature vectors.

13. The system of claim 9, wherein the single feature vector comprises a concatenated vector that includes the first representative feature vector and the second representative feature vector.

14. The system of claim 13, wherein the concatenated vector that includes the first representative feature vector and the second representative feature vector is based on an ordering sequence of cells within the grid.

15. The system of claim 14, wherein the ordering sequence of cells within the grid is based on a particular permutation associated with a particular security level.

16. The system of claim 9, wherein:

the image is a first image;

the object is a first object;

the encrypted single feature vector is an encrypted first single feature vector; and the operations further comprise:

comparing the encrypted first single feature vector to an encrypted second single feature vector, wherein the encrypted second single feature vector represents a second object of a second image; and determining whether the first object and the second object are the same based on the comparing the encrypted first single feature vector to the encrypted second single feature vector.

* * * * *